April 28, 1959 R. C. DU BOIS 2,883,958
DIAL INSTRUMENT
Filed Dec. 19, 1956 2 Sheets-Sheet 2

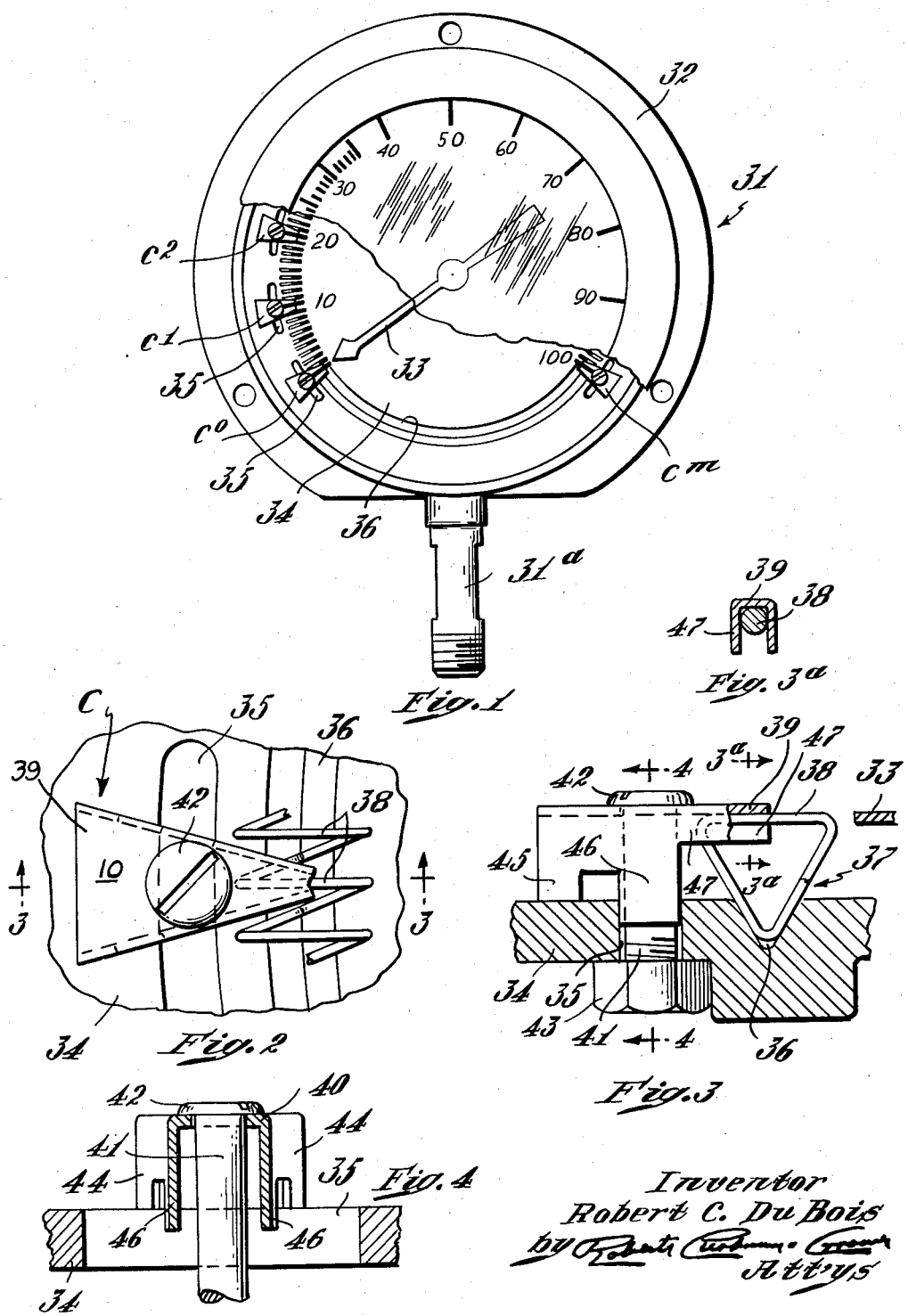

Inventor
Robert C. DuBois
by [signature]
Att'ys

United States Patent Office
2,883,958
Patented Apr. 28, 1959

2,883,958

DIAL INSTRUMENT

Robert C. Du Bois, Fairfield, Conn., assignor to Manning, Maxwell & Moore, Incorporated, Stratford, Conn., a corporation of New Jersey Application December 19, 1956, Serial No. 629,329

6 Claims. (Cl. 116—129)

This invention relates to dial instruments, for example, pressure gauges or dial thermometers wherein a movable index or pointer co-operates with a graduated dial to indicate a variable condition, such as fluid pressure, temperature or the like and pertains more especially to an improved dial for use in such instruments. In the following description, reference will be made to "pressure" as the variable condition, but without intended limitation.

For most purposes, such dials are uniformly graduated but because of unavoidable mechanical limitations, the motion of the pointer of such an instrument seldom follows a straight line ratio relative to a progressively increasing or decreasing pressure. Thus, it is necessary to calibrate each individual instrument, for instance by relatively adjusting or by varying the effective lengths of some of its parts in order to assure reasonable accuracy of indication. Usually, this operation requires that the dial be removed, and possibly repeatedly replaced and removed before accuracy is obtained. Obviously, such an operation is slow and requires substantial skill, and is thus expensive. When very high accuracy is required, for instance in a testing instrument, the calibration method, even though performed with great care, does not produce the desired result and for such cases resort has been had to calibration of the individual dial, that is to say, marking the graduations on the dial so that each respective graduation will be opposite the pointer at a corresponding, carefully measured pressure, the spacing of the graduations thus applied being non-uniform. However, this latter procedure, as heretofore performed, is very slow and expensive, and it has the further disadvantage that a dial, once so calibrated, has no value for use in any other instrument, or even in the same instrument as the response characteristics of the instrument change.

Thus, neither of the previous methods of attempting to obtain accuracy in such instruments is wholly satisfactory, and either method entails undesired expense to the instrument maker.

A principal object of the present invention is to provide a dial of novel and improved construction such as greatly to simplify the calibration of a dial-type instrument. A further object is to provide a dial such that its graduations may readily be relatively spaced to correspond to the positions of the pointer resulting from equal increments of pressure, even though the pointer may not move in a straight line ratio with reference to such pressure variations.

A further object of the present invention is to provide a dial having graduations which, instead of being merely permanent marks or lines on the dial, are relatively movable, physical elements capable of displacement along the index path and with means of fixing them in adjusted position.

A further object is to provide a dial having graduations which are readily adjustable to correspond to positions of the pointer resulting from variations in the condition being measured and which may be relocated from time to time as the characteristics of the instrument change.

A further object is to provide a dial instrument wherein the graduations and pointer are so relatively arranged as to eliminate parallax error in reading.

A further object is to provide a dial having relatively movable graduations with means operative automatically to space them at uniform distances apart within any desired portion of the index path.

A further object is to provide a dial having associated therewith a coiled spring whose turns constitute the graduations with which the pointer co-operates and whose turns tend to be uniformly spaced apart.

A further object is to provide a dial having associated therewith index means which moves in an arcuate path and having associated therewith an open-coiled spring whose axis of curvature is concentric with that of the index path and whose turns constitute the graduations and wherein those portions of the several turns which constitute the graduations are substantially radial with respect to the center of the index path.

A further object is to provide a dial having an open-coiled spring associated therewith and whose turns constitute the graduations and having means for fixedly securing selected ones of said turns to the dial.

Other and further objects and advantages of the invention will be pointed out in the following more detailed description and by reference to the accompanying drawings; wherein, Fig. 1 is a front elevation, with parts broken away, showing a dial instrument embodying the present invention;

Fig. 2 is a fragmentary plan view, to much larger scale than Fig. 1, showing a portion of the dial of the instrument, a portion of the coil spring whose turns constitute the graduations, and one of the clamping devices whereby the spring is secured to the dial;

Fig. 3 is a fragmentary radial section through the dial, to approximately the same scale as Fig. 2, showing the spring clamping means in elevation;

Fig. 3a is a section on the line 3a—3a of Fig. 3;

Fig. 4 is a fragmentary section substantially on the line 4—4 of Fig. 3;

In the attainment of the above objects, in accordance with the present invention, the graduation marks are readily adjustable so that they can be made exactly to correspond to the characteristics of the measuring element. Both the major and minor graduations are attached to or form elements of a spring which is so made that it tends uniformly to space the graduations between any two fixed points. Normally, the major graduations will be set to correspond exactly to the positions assumed by the pointer at these indicated pressures, and held in position by suitable clamping means. When this has been done, the intermediate or minor graduations will automatically space themselves uniformly between the major graduations.

Figure 5:
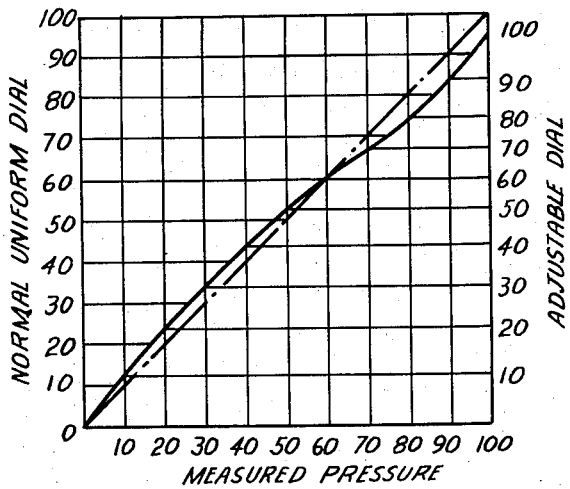
Fig. 5 is a graph illustrating the inaccuracy of the conventional dial instrument as compared with one embodying the present invention.

The graph, shown in Fig. 5 of the drawings, is illustrative of the purpose and advantages of the present invention. In this view, the left-hand, vertical scale represents the readings of a customary, uniformly-graduated dial and the full-line graph shows the pressure as indicated by the pointer of an uncalibrated instrument, in response to accurately measured pressures, as shown on the horizontal scale. This graph line is manifestly non-linear as compared to the broken-straight line which extends diagonally from the zero point to the upper limit of the scale. As a particular instance of the inaccuracy of the full-line for indicating the actual pressure, it may be noted that at a measured pressure of 40 p.s.i. (as referred to the horizontal scale), the curved full-line graph indicates a pressure of approximately 43 p.s.i.

The right-hand, vertical scale illustrates an arrangement of graduations such as is readily obtainable by the device of the present invention. At the points 10, 20, 30, etc., the adjustable graduations have been set to correspond exactly to the characteristics of the gauge as illustrated by the full-line of the graph. It will be noted that the graduations as thus set are not uniformly spaced, but at the major points of the scale, error is completely eliminated. The intermediate graduations, between these major points, will be disposed in a uniform manner by the spring action. However, due to the short space between adjacent major graduations, the error between the characteristic curve of the gauge and a straight line is substantially negligible.

Referring to the drawings, the numeral 31 designates a dial instrument, of generally conventional form, which may, for example, be a pressure gauge. This instrument has the supporting stem 31ª, having an axial bore through which variations in fluid pressure are transmitted to the Bourdon tube or other pressure motor of the instrument, and by means of which the pointer 33 is caused to sweep over the dial 34. As is well understood by those skilled in the art and as above pointed out, because of the character of the means whereby motion of the tip of the Bourdon tube is transmitting to the pointer, the latter does not move through equal arcs in response to equal increments of pressure. In other words, the motion-transmitting means is non-linear in its action, and it is mainly by reason of this non-linear characteristic that it is necessary to calibrate such instruments.

As illustrated in Figs. 1 to 4, inclusive, the dial 34 is of substantial thickness, being of any suitable material (for instance a molded plastic) and is provided with a series of circumferentially elongate, arcuate slots 35 which are spaced apart and located at the approximate positions of the major graduations of the scale, that is to say, for the scale illustrated, at the zero point and the points 10, 20, 30, etc. However, it will be understood that, in accordance with the particular purpose of the instrument, these major graduations may represent greater or lesser intervals in the condition being measured.

The forward face of the dial is provided with a groove 36 (Figs. 1, 2 and 4) of circular curvation and concentric with the axis of the pointer staff, and of a radius less than that of the slots 35. This groove constitutes a seat for the reception of a coiled spring 37 which, as illustrated in Fig. 3, is substantially triangular in transverse section. Merely by way of example, a spring of equilateral triangula shape, 5/16 of an inch on a side, has been found to be desirable. Such a spring may be prepared, for example, by winding fully annealed beryllium-copper wire of a diameter of 0.020″ on a triangular mandrel, with a pitch such that its successive turns will be spaced apart approximately the distance between adjacent minor graduations of the scale. After winding, this triangular spring may be heat-treated in a suitable holder so that it takes a permanent set with its longitudinal axis curved to the radius of the groove 36 and so that its several turns will be accurately positioned relative to each other to have the proper spacing and to provide the desired hardness and resiliency. This heat treatment should be carried out in a holder or die such as to cause the horizontal portions 38 of the several turns normally to extend radially with reference to the center of the dial when the spring is placed in the groove 36. For convenience in description, and because in most of the sectional views, the dial is shown as horizontal, the parts 38 of the spring are referred to as horizontal, although, in most cases, in actual use, they would lie in a vertical plane. It is desirable that the spring, as thus provided, be of such a character that when seated in the groove 36, it will conform itself to the curvature of the groove without requiring it to be otherwise confined. As shown in Fig. 3, the horizontal portions 38 of the spring coils are arranged to lie in the same plane with the pointer 33, thus facilitating accuracy of reading, since it eliminates the parallax error inherent in instruments in which the pointer moves in a plane spaced from the plane of the graduated dial.

For fixing certain of the spring coils (those whose positions correspond to the major graduations of the scale) suitable clamps C are provided. Each of these clamps, as illustrated in Figs. 2, 3 and 4, comprises a top member 39, shown as of generally triangular contour, tapering toward the center of the dial—and opposite side-wall members 44 (Fig. 4) which are substantially vertical and which, at the wider end of the clamp, are shaped to provide the legs 45 (Fig. 3) having lower edges which rest upon the exposed surface of the dial. The clamp may also have leg portions 46 (Figs. 3 and 4) which extend down into the slot 35 in the dial to prevent orientation of the clamp about the axis of the attaching bolt, the top member 39 having an opening midway beween the leg portions 46 through which the attaching bolt 41 passes. This bolt has a head 42 which contacts the top member 39 of the clamp and whose lower screw-threaded end portion extends down through the slot 35 and engages the nut 43. The side walls of the clamp at the inner end of the latter are relatively shallow in depth as shown at 47 in Figs. 3 and 3ª and spaced apart a distance approximately the diameter of the wire of which the spring is formed thereby providing jaws for gripping the wire, and thus, when this narrow or nose end of the clamp straddles the horizontal portion 38 of a turn of the spring coil, it positively holds said part 38 stationary in predetermined fixed position.

In assembling the parts, the spring is disposed in the groove 36 (Fig. 1) and one end turn is fixed in position by clamp C⁰, representing the zero of the scale. The other clamps C′, C², etc. are then assembled with the dial and spring with the narrow nose portion of the clamp C′ engaging the tenth turn of the spring, measured from the zero position, and with the nose portion of the clamp C² engaging the twentieth turn of the spring, counted from the zero position, the other clamps being correspondingly located but all, except the clamp C⁰, being left loose for the time being. Pressure fluid, at an accurately measured pressure of 10 p.s.i., is then admitted through the stem 31 so as to move the pointer 33 to a position corresponding to the measured pressure. The clamp C′ is then moved along the corresponding slot 35 until the part 38 of the tenth turn of the spring is exactly opposite the tip of the pointer. The bolt 41 of the clamp C′ is then tightened to lock this part 38 in this position. The measured pressure is then increased to 20 p.s.i., thus moving the pointer up to a corresponding position and the clamp C² is then adjusted so that the part 38 of the twentieth turn of the spring is directly opposite to the pointer, and the clamp is tightened. This procedure continues until each tenth spring coil has been accurately positioned and fixed in place, the last turn of the coil being fixed in place by the clamp C$^n$. The coils of the spring intermediate these fixed points will automatically adjust themselves to equal distances apart. There is thus provided an instrument which reads with great accuracy as respects all of its major graduations, and since the maximum deviation of almost any commercial instrument of this type, from a straight line ratio, is not great, the departure from absolute accuracy between the fixed graduations is of little moment.

Figure 12:
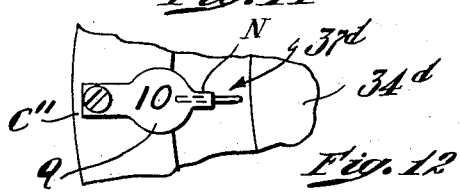
Fig. 12 is another fragmentary section, generally similar to Fig. 3, but showing another arrangement for holding the spring in position.

Since by this means, it is only necessary to calibrate for a limited number of graduations, the time consumed, as compared with the prior procedures, is greatly reduced; moreover, the dial need not be removed during the process. Thus, the cost of manufacture is decreased. It may be noted that with this arrangement, the narrow nose of each respective clamp forms in effect, an indicator which accurately locates the corresponding major graduation. Thus, it would be possible to use a dial having the major graduations already numerically indicated thereon since, although the actual position of a major graduation, that is to say, the coil which is actually held in the nose of the clamp, may vary in one direction or the other with reference to the numerals printed or etched on the dial, the clamped graduation, clearly identified by the narrow nose of the clamp, will be near enough to the printed numeral to be read without danger of error. Obviously, if desired, the major numerals might be carried by the clamps themselves as illustrated in Figs. 2 and 12. A plain, unlettered dial could then be employed. As illustrated in Fig. 1, for example, major divisions of the scale are designated by numerals, printed or otherwise formed on the face of the dial proper, and so arranged that they are all upright when being read.

It may further be noted that with this arrangement, although the graduations are not uniformly spaced, nevertheless as the instrument changes its characteristics during use, the same dial may be employed and the instrument recalibrated merely by loosening the clamps and re-adjusting the spring.

Figure 6:
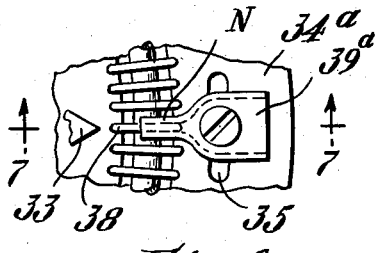
Fig. 6 is a view, generally similar to Fig. 2, but illustrating a slight modification.
Figure 7:
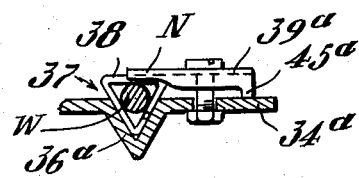
Fig. 7 is a section on the line 7—7 of Fig. 6.

In Figs. 6 and 7, a slight modification is illustrated wherein the dial 34$^a$ is made, for example, of sheet metal and shaped, as by stamping, to provide a V-shaped trough 36$^a$, forming the groove for the reception of the triangular spring 37. In this arrangement, the clamping device comprises the upper member 39$^a$ which is, more or less, rectangular in shape but which has a narrow nose portion N, similar to that of the clamping device above described, and which straddles the upper turn 38 of the spring thereby to fix said turn in position.

Figure 8:
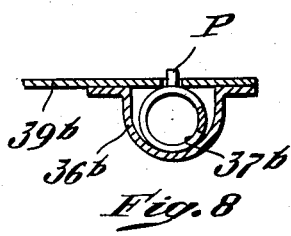
Fig. 8 is a fragmentary section, generally similar to Fig. 3, but showing a modification.

In Fig. 8, a further modification is illustrated wherein the dial 39$^b$ is provided with an attached trough member 36$^b$ which forms a housing for a spring 37$^b$ of circular contour, provided with upwardly directed attached pins or "nubs" P which extend up through suitable openings in the dial.

Figure 9:
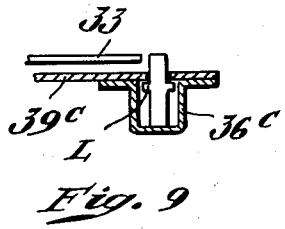
Fig. 9 is another section, generally similar to Fig. 3, but showing a still further modification.
Figure 9A:
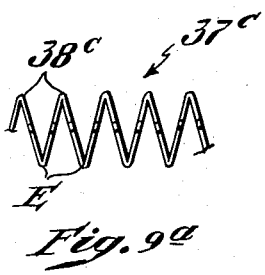
Fig. 9a is a fragmentary side elevation of the spring employed in the arrangement of Fig. 9.

In Figs 9 and 9$^a$, a further modification is shown wherein the dial 39$^c$ has attached to its underside a channel member 36$^c$ which houses the spring 37$^c$. In this instance, the spring is of accordion type, consisting of a thin ribbon of sheet metal bent to zigzag form so as to have the sharp bends E at its bottom and the alternating sharp bends 38$^c$ at its top—these latter bends constituting the scale graduations. This spring is seated in the channel member 36$^c$ (Fig. 9) with its upper portion extending up through a slot in the dial 39$^c$. Desirably, this spring will have lugs L projecting from its opposite edges to retain it within the channel 36$^c$ and also to center it with respect to the side walls of the channel.

Figure 11:
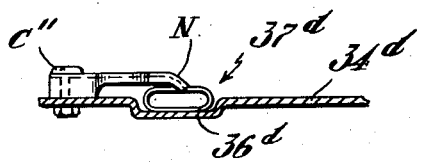
Fig. 11 is a view generally similar to Fig. 3, but showing the employment of an elliptical spring.

In Fig. 11, the dial 34$^d$ is shown as having an integral downwardly depressed portion 36$^d$ which forms a channel for the reception of a coiled spring 37$^d$ of elliptical contour, having its major axis horizontal. The clamping member C$^{11}$, which is secured to the dial in substantially the same way as the clamping members above described, has a narrow nose N which engages the upper portion of one of the turns of the spring thereby to hold said turn in fixed position. In this arrangement (Fig. 12), the clamping member is shaped to provide a surface Q on which a numeral, designating a major graduation, may be placed.

Figure 10:
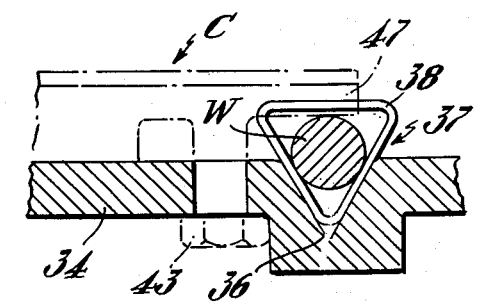
Fig. 10 is a view generally similar to Fig. 3, but showing means to prevent distortion of the spring by the clamping means.

In order to prevent distortion of the spring by the pressure of the clamping device, it may be desirable to insert within the spring a wire W, Figs. 7 and 10, of a diameter such that while engaging the downwardly converging portions of the triangular spring coil, it will form a stop to prevent the nose portion of the clamping device from applying excessive pressure to the upper turn 38 of the spring coil. However, it is contemplated that by a proper design and dimensioning the clamp, for example as illustrated in Fig. 3, such precaution may not be necessary.

While certain desirable embodiments of the invention have herein been disclosed by way of example, it is to be understood that the invention is broadly inclusive of any and all modifications following the scope of the appended claims.

I claim:

1. A dial for use in an instrument comprising an index which moves in an arcuate path and in a plane parallel to but spaced from the face of the dial, a series of physical elements adjustably movable relatively to each other and to the dial proper and in the same plane as that in which the index moves, said elements constituting scale graduations for co-operation with the index, and characters designating major divisions of the scale arranged on the face of the dial and inwardly of the scale graduations, the elements which constitute the graduations being portions of turns of an open-coiled spring, said portions being substantially rectilinear and radial with respect to the axis of the index, the spring being approximately triangular in transverse section and with one flat face disposed uppermost and in the plane of motion of the index, those parts of the turns of the spring which collectively form said flat face being the graduation-forming elements, and means whereby selected ones of said elements may be releasably fixed relatively to the dial proper.

2. A dial, according to claim 1, wherein the means for releasably fixing the graduation elements comprises clamping devices, each independent of the spring and each adjustable in an arcuate path concentric with that of the index, each clamping device having means engageable with one of the graduation elements to hold the latter in predetermined position, means for releasably securing each respective clamping device in adjusted position, and means operative to prevent distortion of the spring by the action of said securing means.

3. A dial for use in an instrument having an index which moves along a predetermined planar path in response to variations in a physical condition, said dial having an elongate channel in its front face, said channel being parallel to the index path, the channel being V-shaped in transverse section, an open-coiled spring whose constituent turns are so shaped that the coil is substantially triangular in transverse section, the spring being so seated in the channel in the dial that one of its flat faces is forward of and parallel to the face of the dial, those portions of the turns of the coil which form said flat face being substantially rectilinear and perpendicular to the index path and in substantially the same plane as that of the path of the index, said rectilinear portions of the turns constituting graduations for co-operation with the dial, and means operative releasably to fix selected ones of said graduations in predetermined position relative to the dial, the means for releasably fixing the graduations comprising clamps, each adjustable, independently of the spring, along the index path, and each having a narrow nose directed toward the index path, said nose comprising spaced parts operative to receive a single selected turn of the spring between them and to hold the selected turn in a predetermined position, each of said clamps carrying a designating character disposed in a plane parallel to and closely adjacent to the plane of motion of the index for identifying the particular graduation which is held by said clamp.

4. In combination with a dial for use in an instrument wherein an index is arranged to move along an arcuate planar path in response to variations in a physical condition, the means which moves the index, in response to variations in said condition, being non-linear in its action so that the index does not move through uniform distances in response to equal increments in said condition, a series of elements movable relatively to each other and to the dial proper and which constitute scale graduations for co-operation with the index, numerals for designating the major divisions of the scale disposed in a plane perpendicular to the axis of the index, said numerals being so oriented that they are all upright when being read, and means whereby each of those of said graduation elements which is to designate a major division of the scale may be releasably fixed so as accurately to register with the index at that position which the index occupies in response to an accurately predetermined condition represented by a respective major scale division, those graduation elements, which intervene between adjacent elements which have been fixed in position being uniformly spaced apart, each graduation element lying substantially in the plane of motion of the tip of the index and being radial with reference to the axis of the index and constituting a portion of a turn of an open-coiled spring whose longitudinal axis is concentric with the index path, and the means for releasably fixing selected graduation elements comprising a plurality of clamping devices, independent of the spring, each adjustable in an arcuate path, concentric with that of the index and each having positioning jaws spaced apart to receive a single graduation element between them thereby to hold the selected graduation element stationary in a definite position.

5. A dial for use in a pressure gauge wherein an index element moves parallel to the face of the dial in response to varying pressures, and which has a plurality of graduations with which the index co-operates, the graduations being portions of the several turns, respectively, of a helical spring, the graduations being radial with reference to the axis about which the index turns but being adjustable circumferentially of the dial relatively to each other and to the dial proper so that a selected graduation may be disposed so as accurately to register with the index in that position which the latter assumes in response to an accurately measured pressure, and a clamp for releasably fixing a graduation which has been so adjusted relatively to the dial proper, said clamp having an inner end portion which overlies the selected graduation and which has members spaced apart to receive and to hold said graduation between them, the clamp having an outer portion provided with dial-contacting legs, and means engaging the clamp, intermediate its inner and outer portions, for securing it to the dial.

6. A dial for use in an instrument comprising an index which moves in an arcuate path and in a plane parallel to but spaced from the face of the dial, characters upon the face of the dial designating major divisions of the scale, and a series of physical elements adjustably movable relatively to each other and to the dial proper and in substantially the same plane as that in which the index moves, said elements constituting scale graduations, the elements which constitute the graduations being portions of turns of an elongate, open-coiled spring whose axis is permanently curved and concentric with the index path, those portions of the turns of the spring which constitute the graduations being rectilinear and being radial with reference to the axis of the index, the dial proper having an arcuate channel in its front face located adjacent to but outwardly beyond the path of the tip of the index, the bottom of said channel being of the same radius as the longitudinal axis of the spring, the channel forming a seat for the spring, the dial having spaced arcuate slots of a radius exceeding that of said channel and located, respectively, at approximately the positions of the major scale graduations, and clamping devices, each independent of the spring and each operative to hold a selected one of said graduations in adjusted position, each clamping device having a narrow nose portion at its inner end provided with spaced elements operative to receive between them a single selected turn of the coil for holding the latter stationary in adjusted position, each clamping device having spaced, dial-contacting legs at its outer part, and a transverse portion having an aperture for the reception of a bolt, passing through a corresponding one of said arcuate slots, for securing the clamping device to the dial.

References Cited in the file of this patent

UNITED STATES PATENTS

| | | |
|---|---|---|
| 1,663,983 | Hopgood | Mar. 27, 1928 |
| 2,201,941 | Behr | May 21, 1940 |
| 2,293,064 | Kahn | Aug. 18, 1942 |
| 2,526,921 | Ahblom | Oct. 25, 1950 |
| 2,717,775 | Jackson | Sept. 13, 1955 |